Patented Jan. 7, 1941

2,227,606

UNITED STATES PATENT OFFICE 2,227,606

CONVERSION OF HYDROCARBONS

Hugh S. Taylor and John Turkevich, Princeton, N. J., assignors to Process Management Company, Incorporated, New York, N. Y., a corporation of Delaware No Drawing. Application December 22, 1937, Serial No. 181,146

6 Claims. (Cl. 260—668)

This invention relates to the treatment of hydrocarbons to convert them to related hydrocarbons of substantially different chemical and physical properties. More particularly the invention relates to the treatment of aliphatic hydrocarbons having at least 6 carbon atoms per molecule to convert them to cyclic hydrocarbons.

The invention contemplates the catalytic treatment of aliphatic hydrocarbons having at least 6 carbon atoms per molecule at elevated temperature by means of a chromium oxide catalyst whereby a substantial proportion of the said aliphatic hydrocarbons is converted to cyclic hydrocarbons, for example, benzene ring compounds. In its preferred form the invention contemplates the treatment of hydrocarbons having at least 6 carbon atoms in the primary chain of each molecule, for example, hydrocarbons having in the primary chain of each molecule a series of 6 carbon atoms, none of which has attached thereto more than one side chain.

The invention further contemplates the use of a chromium oxide catalyst of the type suitable for promoting hydrogenation-dehydrogenation reactions. Catalysts of this nature may be prepared by various methods, such as by precipitation, reduction and ignition, using various source materials. For example, a black, vitreous chromium oxide gel-type catalyst may be used. This catalyst may be prepared by the following procedure:

To a relatively dilute solution of chromium nitrate, made by dissolving 76 grams of $Cr(NO_3)_3 \cdot 9H_2O$ in 6 liters of water, is added dropwise and with vigorous stirring about 6 liters of 0.1 normal ammonium hydroxide, made by dissolving 38 c. c. of concentrated ammonium hydroxide (29% ammonia) in 6 liters of water. The addition of the first half of the ammonium hydroxide to the chromium nitrate solution is carried out very slowly, for example, at the rate of about 3 liters in 6 hours. Stirring is continued for about 4 hours to dissolve any precipitate which may have formed. The remainder of the hydroxide is then added with continued stirring. On completion of the addition of the ammonium hydroxide the precipitate formed is allowed to settle and the excess liquid removed by decantation. The precipitate is then washed several times by agitation with fresh water, settling and decanting the wash water. When the supernatant liquid becomes turbid due to peptization of the chromium oxide washing is complete. The precipitate is then filtered and dried at 100° C. for several hours. Before use the dried precipitate may be gradually heated to approximately 300° C. and held at this temperature for about 10 hours.

It has also been suggested to produce a chromium oxide catalyst by acidifying an aqueous solution of chromium nitrate with acetic acid and then precipitating a gel therefrom by means of ammonia, the gel being washed thoroughly with water and dried slowly to produce a dark colored vitreous material.

According to the present invention, the hydrocarbons to be converted are brought into contact with the catalyst at a temperature of 325° to 625° C. with the preferred operating temperature depending upon the particular hydrocarbons under treatment. For example, in the treatment of heptane according to the present invention it is preferred to maintain the temperature at 450° to 550° C. Higher temperatures may be employed, however, without departing in the least from the scope of the invention.

Chromium oxide prepared in the manner described above or by a suitable modification thereof is an excellent dehydrogenating agent. In dehydrogenating reactions an equilibrium is attained between the hydrogenated product, the dehydrogenated product and hydrogen. For example, in the dehydrogenation of heptane, at any definite temperature and pressure a definite concentration of heptene, hydrogen and unchanged heptane is obtained if sufficient time is allowed for the reaction to reach the equilibrium state. The function of the catalyst is to decrease the time for reaching equilibrium. In dehydrogenation reactions, therefore, it is advantageous to pass the reactant over the catalyst at the highest rate consistent with obtaining substantial equilibrium since a slower rate results in the formation of no additional dehydrogenated product. In the dehydrogenation of paraffins, therefore, it is customary to pass them over the chromium oxide catalyst at a rate considerably higher than the highest rates preferred in this invention. No apparent advantage appeared to reside in operating at a longer period of contact than that necessary to attain equilibrium conditions. In connection with the present invention, however, it has been discovered that chromium oxide suitably prepared, as by the above example, aside from being an excellent dehydrogenating catalyst, is a powerful ring-closing catalyst as well.

While the invention is not to be limited by any theoretical consideration of the mechanism of the reaction, apparently the closing of the ring is a much slower reaction than the dehydrogenation reaction, so that when operating under the conditions necessary for attaining equilibrium dehydrogenation the ring-closing action of the catalyst is not apparent. On increasing the time of contact, however, the ring-closing action of the catalyst becomes increasingly important until at flow rates considerably lower than those suitable for attaining equilibrium dehydrogenation the formation of aromatics predominates and becomes much more important than the production of olefins. Again relying on theoretical considerations without intending to limit the invention thereby, it is probable that chromium oxide converts heptane or heptene to a cycloparaffin which is then dehydrogenated to toluene. It is believed that in the case of heptane the primary reaction involves dehydrogenation of heptane to heptene, which is a fairly rapid reaction. This is followed by the very slow ring-closing reaction, which in turn is followed by the rapid dehydrogenation of the cycloparaffin, formed to toluene.

The invention is concerned particularly with the cyclization of aliphatic hydrocarbons having at least 6 carbon atoms per molecule. Preferably, the hydrocarbons should contain at least 6 carbon atoms in the primary chain of the molecule, and most advantageously the hydrocarbons to be treated should contain in the primary chain of each molecule a series of 6 carbon atoms, none of which has attached thereto more than one side chain.

Under ordinary conditions of operation in the dehydrogenation of aliphatic hydrocarbons by means of a chromium oxide catalyst the production of aromatic amounts to a small fraction of the olefin production. According to the present invention, the production of aromatics may be increased by regulating the conditions of flow of the hydrocarbons over the catalyst at any fixed condition of temperature and pressure whereby the products contain a percentage of aromatics ranging from one-half to two or more times as great as the equilibrium percentage of olefins attainable under the same conditions of temperature and pressure.

For example, in order to obtain a substantial percentage of aromatic it has been discovered that the rate of flow of hydrocarbons at temperatures up to 450° over the catalyst should be less than 1 cc. of hydrocarbon (liquid basis) per hour per c. c. of catalyst and preferably should be substantially less, for example, 0.15 c. c. of hydrocarbon (liquid basis) per c. c. of catalyst per hour.

The above flow rate refers to the catalyst on a volumetric basis because it is a more accurate index of catalyst capacity than the weight of the catalyst employed regardless of small variations in apparent density. The catalyst used in the present invention is preferably granular in form. This form may be obtained by crushing large pieces or by forming fines into pills. However, the method of manufacture described above produces material having inherently quite uniform size. Ordinarily, all will pass an eight mesh screen and practically all will be retained by a twenty mesh screen. Preferaby, fines are eliminated. The above, and the following, explanation of flow rates refers to volume units of a granular chromium oxide catalyst, of which that produced by the above-described method is an example.

*Example I*

A 15 c. c. specimen of a chromium oxide catalyst of the nature described above was used, and heptane was passed thereover at the rate of .25 c. c. (liquid basis) per minute for a period of 137 minutes while maintaining a temperature of 475° C. in the reaction zone. The liquid product had a specific gravity of .7173 and included 18% olefins, 13% aromatic compounds and about 4% naphthenes.

*Example II*

A 15 c. c. specimen of the catalyst was used, and heptane was passed thereover at the rate of .34 c. c. (liquid basis) per minute while maintaining a temperature of 625° C. for a period of 63 minutes. The liquid product obtained contained 10% olefins and 26% aromatic compounds.

*Example III*

A 100 c. c. specimen of the catalyst was used, and heptane was passed thereover at a rate of .25 c. c. (liquid basis) per minute while maintaining the temperature in the reaction zone at about 475° C. The liquid product produced in the first hour contained 10% olefins and 45% aromatic compounds.

The rate of flow of the hydrocarbon under treatment in Examples I and II is about 1 c. c. (liquid basis) per c. c. of catalyst per hour while in Example III the rate of flow is approximately .15 c. c. liquid basis of hydrocarbon per c. c. of catalyst per hour. The results obtained in these examples, however, are not strictly comparable in view of the fact that the activity of the catalyst decreases at a decreasing rate throughout the period of contact of hydrocarbons and catalyst. The effect of rate of flow is more clearly shown in the following tabulation of results obtained in the treatment at various temperatures for periods of 5 hours at various rates of flow in which the flow of heptane by contact with a chromium oxide catalyst wherein the rate is in c. c. liquid basis of heptane per c. c. of catalyst per hour and wherein percentages of olefin and aromatics in the liquid product are given.

| Temp. | Rate | Percent olefins | Percent aromatics |
|---|---|---|---|
| 425° C. | 0.15 | 10 | 11 |
| 425° C. | 1.00 | 10 | 2 |
| 450° C. | 0.15 | 12 | 23 |
| 450° C. | 1.00 | 12 | 4 |
| 475° C. | 0.15 | 12 | 38 |
| 475° C. | 1.00 | 11 | 7 |
| 475° C. | 2.00 | 8 | 2 |
| 500° C. | 1.00 | 10 | 7 |
| 500° C. | 2.00 | 8 | 3 |
| 525° C. | 1.00 | 11 | 6 |
| 525° C. | 2.00 | 8 | 3 |
| 550° C. | 1.00 | 14 | 5 |
| 550° C. | 2.00 | 9 | 2 |

It will be noted that for each temperature the percentage of olefins is not substantially changed by changes in the rate of flow of the hydrocarbon over the catalyst, whereas a decrease in the rate of flow resulted in sharp increases in the percentage of aromatics. For example, at 475°, 500°, and 525° C. increasing the rate of flow from 1 to 2 c. c. per c. c. of catalyst per hour resulted in a decrease of 20% in the olefin percentage and a decrease of 50–60% in the aromatic percentage whereas at 425°, 450° and 475° a decrease in the rate of flow from 1 to .15 c. c. per c. c. of catalyst per hour resulted in substantially no change in olefin precentage but an increase of approximately 450% in the aromatic percentage.

The present invention, therefore, provides a method of converting aliphatic hydrocarbons to aromatic and other cyclic compounds by the catalytic treatment of such hydrocarbons at moderate temperatures and affords a method whereby the relative production of olefins and aromatics can be controlled substantially at will.

Specific examples have been resorted to in illustrating the operation of the present invention. It is to be understood, however, that the invention is not limited by such specific examples but is capable of other modifications.

We claim:

1. A method for cyclicizing aliphatic hydrocarbons having at least six carbon atoms per molecule which comprises passing said aliphatic hydrocarbons through a reaction zone containing a chromium oxide catalyst at a temperature sufficiently high and at a flow rate per unit of catalyst volume sufficiently low to effect conversion of said aliphatic hydrocarbons to aromatic hydrocarbons.

2. A method for cyclicizing aliphatic hydrocarbons having at least six carbon atoms per molecule which comprises passing said aliphatic hydrocarbons through a reaction zone containing a chromium oxide catalyst at temperatures of 325° to 625° C. at a flow rate per unit of catalyst volume sufficiently low to effect substantial cyclization of said aliphatic hydrocarbons whereby the weight per cent of aromatic hydrocarbons in the liquid reaction products is at least one half as great as that of the olefinic hydrocarbons.

3. A method for cyclicizing aliphatic hydrocarbons having at least six carbon atoms per molecule which comprises passing said aliphatic hydrocarbons through a reaction zone containing a chromium oxide catalyst at temperatures of 325° to 625° C. at a flow rate sufficiently great to effect production of aromatic hydrocarbons at a substantial rate but not greater than two unit volumes (liquid basis) per hour per unit of catalyst volume.

4. A method for cyclicizing aliphatic hydrocarbons having at least six carbon atoms per molecule which comprises passing said aliphatic hydrocarbons through a reaction zone containing a chromium oxide catalyst at temperatures of 425° to 550° C. at a flow rate of .15 to 2 unit volumes (liquid basis) per hour per unit of catalyst volume.

5. A method for cyclicizing aliphatic hydrocarbons having at least six carbon atoms per molecule which comprises passing said aliphatic hydrocarbons through a reaction zone containing catalytic material having the dehydrogenating and cyclicizing properties of chromium oxide dehydrogenating and cyclicizing catalyst at a temperature of about 450° to 550° C. and at a flow rate of about 0.15 to 2 volumes (liquid basis) per hour per unit of catalyst volume, to effect conversion of said aliphatic hydrocarbons to aromatic hydrocarbons.

6. A method for cyclicizing aliphatic hydrocarbons having at least six carbon atoms per molecule which comprises passing said aliphatic hydrocarbons through a reaction zone containing catalytic material having the dehydrogenating and cyclicizing properties of chromium oxide dehydrogenating and cyclicizing catalyst at a temperature of about 450° to 550° C. and at a flow rate per unit of catalyst volume sufficiently low to effect substantial cyclization of said aliphatic hydrocarbons whereby the weight per cent of aromatic hydrocarbons in the liquid reaction products is at least one-half as great as that of the olefinic hydrocarbons to effect conversion of said aliphatic hydrocarbons to aromatic hydrocarbons.

HUGH S. TAYLOR.
JOHN TURKEVICH.